United States Patent
Frauenschuh et al.

(10) Patent No.: US 12,459,047 B2
(45) Date of Patent: Nov. 4, 2025

(54) MULTIPLE PULSE WELDING PROCESS

(71) Applicant: Fronius International GmbH, Pettenbach (AT)

(72) Inventors: Rupert Frauenschuh, Pettenbach (AT); Josef Artelsmair, Pettenbach (AT); Dominik Söllinger, Pettenbach (AT); Michael Muss, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 657 days.

(21) Appl. No.: 17/602,336

(22) PCT Filed: Apr. 9, 2020

(86) PCT No.: PCT/EP2020/060254
§ 371 (c)(1),
(2) Date: Oct. 15, 2021

(87) PCT Pub. No.: WO2020/208187
PCT Pub. Date: Oct. 15, 2020

(65) Prior Publication Data
US 2022/0161345 A1    May 26, 2022

(30) Foreign Application Priority Data
Apr. 10, 2019   (EP) .................... 19168535

(51) Int. Cl.
*B23K 9/09*      (2006.01)
*B23K 9/095*     (2006.01)
*B23K 9/10*      (2006.01)

(52) U.S. Cl.
CPC .............. *B23K 9/09* (2013.01); *B23K 9/0953* (2013.01); *B23K 9/1012* (2013.01)

(58) Field of Classification Search
CPC .. B23K 9/0953; B23K 9/1012; B23K 9/1675; B23K 9/1735
(Continued)

(56) References Cited

U.S. PATENT DOCUMENTS 4,806,735 A    2/1989   Ditschun et al.
8,274,012 B2   9/2012   Yamazaki et al.
(Continued)

FOREIGN PATENT DOCUMENTS

CN    101564784 A    10/2009
CN    101804495 A    8/2010
(Continued)

OTHER PUBLICATIONS

English language translation of Office action of counterpart Chinese Patent Application No. 202080027474.9, Notification Date Jul. 5, 2022.
(Continued)

*Primary Examiner* — Steven W Crabb
*Assistant Examiner* — Dilnessa B Belay
(74) *Attorney, Agent, or Firm* — GREENBLUM & BERNSTEIN, P.L.C.

(57) ABSTRACT

In order to synchronize the at least two pulse welding processes performed simultaneously by welding devices in a multiple pulse welding process, the welding devices are connected to one another by a communication link and synchronization information is transmitted via the communication link from a transmitting welding device to at least one receiving welding device. The synchronization information is used in the receiving welding device to synchronize the pulse welding process performed by the receiving welding device with the pulse welding process performed by the transmitting welding device.

12 Claims, 4 Drawing Sheets

(58) Field of Classification Search
USPC .......................................................... 219/137
See application file for complete search history.

(56) References Cited

U.S. PATENT DOCUMENTS

| | | | |
|---|---|---|---|
| 10,035,211 B2 | 7/2018 | Peters | |
| 2002/0190045 A1 | 12/2002 | Stava et al. | |
| 2006/0237409 A1* | 10/2006 | Uecker | B23K 9/1735 |
| | | | 219/130.5 |
| 2008/0011728 A1* | 1/2008 | Peters | B23K 9/1062 |
| | | | 219/130.5 |
| 2008/0245781 A1 | 10/2008 | Wilhelm | |
| 2015/0343549 A1 | 12/2015 | Henry et al. | |

FOREIGN PATENT DOCUMENTS

| | | |
|---|---|---|
| CN | 105246634 A | 1/2016 |
| DE | 102007016103 A1 | 10/2008 |
| JP | 2002-263838 A | 9/2002 |
| JP | 2005-349405 A | 12/2005 |
| WO | 2011/138667 A1 | 11/2011 |
| WO | 2014-140772 A2 | 9/2014 |

OTHER PUBLICATIONS

Office action of counterpart Japan Application No. 2021-559740, delivered Oct. 28, 2022, along with English language translation of Office action.
International Search Report issued in International Patent Application No. PCT/EP2020/060254, dated Jul. 17, 2020, along with an English translation thereof.
Written Opinion in the International Searching Authority issued in International Patent Application No. PCT/EP2020/060254, dated Jul. 17, 2020.

* cited by examiner

MULTIPLE PULSE WELDING PROCESS

The present invention relates to a method for synchronizing at least two pulse welding processes for carrying out a multiple pulse welding process, whereas a pulse welding process consisting of periodically at a pulse frequency repeated welding cycles having a pulse current phase and a base current phase, whereas each pulse welding process is performed by means of a welding device, the welding devices are connected to one another by means of a communication link and whereas a synchronization information is transmitted via the communication link from a transmitting welding device to at least one receiving welding device and said synchronization information being used in the receiving welding device to synchronize the pulse welding process performed by means of the receiving welding device with the pulse welding process performed by means of the transmitting welding device. The invention also relates to an arrangement for carrying out a multiple pulse welding process.

The present invention relates to pulse welding using a consumable or non-consumable welding electrode with a pulsed arc. In this welding method, a base welding current and a higher pulse welding current alternate regularly at a predetermined pulse frequency. During the base welding current phase with the base welding current, the arc burns at low power in order to keep the weld pool liquid. During the pulse current phase with the pulse welding current, a large droplet of the welding wire as filler material forms, which is ultimately detached and drops into the weld pool. The welding wire may also serve as a consumable welding electrode, for example in MIG (metal inert gas) or MAG (metal active gas) welding, or may be fed to an arc that burns between a non-consumable welding electrode and the workpiece, for example in TIG (tungsten inert gas) welding. In the case of TIG welding, the welding process is often referred to as DC pulse or TIG AC. Depending on the wire diameter and the material of the welding wire, the welding wire feed speed and the pulse frequency should be selected and adapted to one another in MIG/MAG welding such that a droplet is produced and detached with each current pulse. The welding wire feed speed and pulse frequency are dependent on one another. If the values chosen for the welding wire feed speed and the pulse frequency are unsuitable, a stable welding process cannot be achieved and/or a good welding quality cannot be achieved. With pulse welding, the heat input into the workpiece can be reduced and controlled, which means that thinner workpieces can also be welded. In addition, pulse welding produces high-quality welding results, for example, it can greatly reduce spatter.

In order to increase the welding performance, multiple pulse welding methods, for example a tandem pulse welding method, have become known in which at least two pulse welding processes are operated simultaneously. Preferably, at least two welding wires melt in a common weld pool. However, the individual pulse welding processes may also each have their own weld pool. Separate welding devices are required for each pulse welding process, i.e. a power source, a welding torch and, if necessary, a welding wire feed unit. A pulse welding process is implemented by means of each welding device. For MIG/MAG, multiple pulse welding can be operated in such a way that the welding processes are started and operated independently of one another, i.e. the welding wire feed speed and the pulse frequency are set separately for each welding process. In TIG welding, usually only the pulse frequencies are set, but the welding wire feed speed of the filler material could also be set. However, this is more time-consuming for the welder, as the welding parameters must be set accordingly in all welding devices. Apart from that, the welder has little or no influence on any mutual influence caused by the welding processes running at the same time, which can reduce the welding quality.

For this reason, a tandem pulse welding method with synchronized welding processes has also become known, in which a welding device is given a pulse frequency which is followed by the other welding device. Both welding processes are thus synchronized with one another and weld at the same pulse frequency. However, this can lead to problems in MIG/MAG welding if the welding wire of the trailing welding process is being fed in at a different welding wire feed speed than in the other welding process, which is often desirable to increase process stability. Synchronized welding processes are also desirable in TIG welding. However, a lower welding wire feed speed usually also requires a lower pulse frequency, because the power balance between the wire feed and welding current must be coordinated with one another. If there is too great a difference between the welding wire feed speed in the leading pulse welding process and in the trailing pulse welding process, it is possible that the trailing pulse welding process will be operated at a pulse frequency that is too high (said pulse frequency being adopted from the leading welding process), which means that a stable welding process may not be possible with the trailing pulse welding process or the welding result may be poor (e.g. weld spatter).

In order to solve this problem, it has already been proposed in DE 10 2007 016 103 A1 that the pulse frequency of the trailing pulse welding process of a tandem pulse welding process can be set as an integral multiple of the pulse frequency of the leading pulse welding process. The pulse frequencies of the two pulse welding processes should be selected such that the pulse current phases do not overlap. However, it does not explain how the synchronization of the two pulse welding processes can be achieved.

It is therefore an object of the present invention to specify a method for synchronizing a plurality of simultaneously running pulse welding processes in a multiple pulse welding process.

This object is achieved according to the invention in that the transmitting welding device transmits a synchronization pulse as synchronization information to at least one receiving welding device, the synchronization pulse being in a defined temporal relation to the welding cycle of the pulse welding process of the transmitting welding device, and the welding cycle of the pulse welding process of the receiving welding device being synchronized based on the received synchronization pulse.

By virtue of the synchronization pulse, the receiving welding device is able to synchronize the pulse welding process to be performed with the pulse welding process in the transmitting welding device in order to ensure the desired relationship between the two pulse welding processes. In order to prevent the two pulse welding processes from drifting apart, such a synchronization pulse could also be repeated at regular intervals.

The synchronization information that is required for the synchronization of the pulse welding processes can thus be transmitted in a simple manner via the communication link. The synchronization can thus take place automatically without a welder having to intervene or set welding parameters.

For a simple implementation of the multiple pulse welding process, the pulse frequency of the pulse welding process of the receiving welding device can be known in the receiving welding device or can be determined from a known welding characteristic curve.

Alternatively, the pulse frequency of the transmitting welding device or the pulse frequency to be set by the receiving welding device can also be transmitted to the receiving welding device as synchronization information. In an advantageous embodiment, the pulse frequency to be set by the receiving welding device can be determined in the receiving welding device from the received pulse frequency of the transmitting welding device by means of a known frequency divider. This makes it possible to adapt the pulse welding process in the receiving welding device to the pulse welding process in the transmitting welding device.

A further advantageous embodiment results when the transmitting welding device continuously transmits, at least during synchronization, synchronization pulses as synchronization information at the pulse frequency of the transmitting welding device to the receiving welding device and the receiving welding device determines the pulse frequency of the transmitting welding device from the period of the received synchronization pulses and from this determines the pulse frequency to be set in the receiving welding device by means of a known frequency divider. This makes it possible to adapt the pulse welding process in the receiving welding device to the pulse welding process in the transmitting welding device.

The frequency divider is particularly advantageously determined in the receiving welding device from a known welding characteristic curve, and the pulse frequency to be set by the receiving welding device is determined from the pulse frequency of the transmitting welding device and from the frequency divider. A pulse frequency required for the pulse welding process is preferably determined from the welding characteristic curve from a set welding wire feed speed of the pulse welding process of the receiving welding device, whereas the frequency divider is determined from the required pulse frequency and the received pulse frequency of the transmitting welding device. In this way, the pulse frequency of the receiving welding device can be optimally set taking into account a stored welding characteristic curve, such that the welding process is taken into account when determining the pulse frequency.

For the multiple pulse welding process, it can be advantageous if the synchronization pulse is transmitted with a predetermined phase shift at the start of the welding cycle in the transmitting welding device and/or the welding cycle is started in the receiving welding device with a predetermined phase shift after the synchronization pulse is received. In this way, a desired phase position of the pulse welding processes can be ensured.

The present invention is described in greater detail in the following with reference to FIG. 1 to 7, which show advantageous embodiments of the invention by way of example, schematically, and in a non-limiting manner. In the drawings.

The invention is explained below for a tandem pulse welding process, that is to say involving two pulse welding processes, as an example of a multiple pulse welding process. However, it is of course conceivable to apply the following statements to a multiple pulse welding process having more than two pulse welding processes. A multiple pulse welding process is characterized in particular by the fact that at least two pulse welding processes run simultaneously, and thus two pulse welding processes in the case of a tandem pulse welding process. The multiple pulse welding processes can all work in the same weld pool, but different pulse welding processes can also work in different weld pools.

Figure 1:
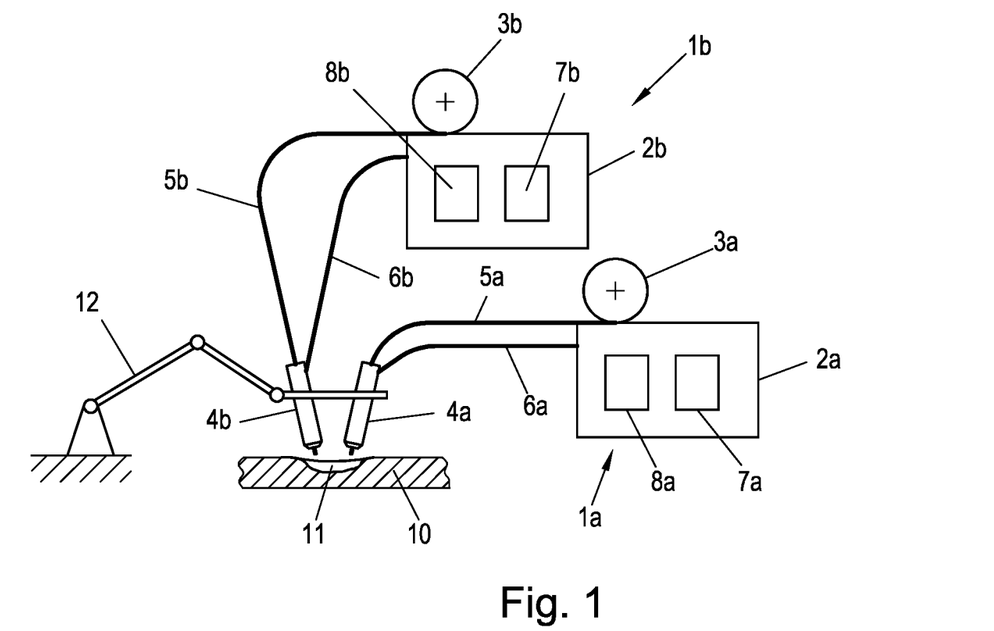
FIG. 1 shows an arrangement for carrying out a multiple pulse welding process.

A possible configuration for a tandem pulse welding process is shown schematically in FIG. 1. There are two separate welding devices 1a, 1b, each having a power source 2a, 2b, a welding wire feed unit 3a, 3b (in TIG welding also without a welding wire feed unit 3a, 3b) and a welding torch 4a, 4b. The power sources 2a, 2b each provide the required welding voltage, which is applied to the welding wire 5a, 5b as the consumable welding electrode of the welding process. For this purpose, a contact sleeve, for example, to which the welding voltage is applied, for example via a welding line 6a, 6b, and which is contacted by the welding wire 5a, 5b may be provided in a welding torch 4a, 4b. However, a welding torch 4a, 4b having a non-consumable welding electrode to which the welding voltage is applied via the welding line 6a, 6b may also be used. In this case, the welding wire 5a, 5b is fed into the arc that burns between the non-consumable welding electrode and the material.

A specific welding current thus flows through the welding electrode in each case, with a second welding line (not shown in FIG. 1) being of course provided for this purpose for contacting the workpiece. The welding wire 5a, 5b is fed in by the welding wire feed unit 3a, 3b at a specific welding wire feed speed in each case. The welding wire feed unit 3a, 3b may be integrated in the welding device 1a, 1b in each case, but it may also be a separate unit. The welding wire 5a, 5b and the welding line 6a, 6b of a welding device 1a, 1b, and possibly also other lines between the power source 2a, 2b and the welding torch 4a, 4b (for example a control line or a coolant line), may also be guided in a common hosepack or in a plurality thereof. The hosepack may be coupled to the welding torch 4a, 4b and to the power source 2a, 2b via suitable couplings. A control unit 7a, 7b, which controls and monitors the pulse welding process, is also provided in a welding device 1a, 1b. For this purpose, required welding parameters, such as the pulse frequency, the welding wire feed speed, the values of the welding currents, the pulse current duration, base current duration, etc., are preset or adjustable in the control unit 7a, 7b. An input/output unit 8a, 8b may also be provided for inputting or displaying certain welding parameters or a welding status. Such a welding device 1a, 1b is of course well known and need not be described in more detail here. For a multiple pulse welding process having more than two pulse welding processes, a corresponding number of additional welding devices 1a, 1b are of course provided. A plurality of welding devices 1a, 1b of a multiple pulse welding process may also be arranged in a common housing, possibly also with the associated welding wire feed units 3a, 3b.

In order to implement a tandem welding process, the two welding torches 4a, 4b are arranged locally relative to one another in the embodiment shown, such that they work in a common weld pool 11 on a workpiece 10. This relative arrangement may be fixed, for example in that both welding torches 4a, 4b are arranged on a welding robot 12 which guides both welding torches 4a, 4b (as indicated in FIG. 1). However, this arrangement may also be variable, for example in that one welding torch 4a, 4b is guided by one welding robot 12 each. It is also irrelevant whether the welding torches 4a, 4b are arranged one behind the other, next to one another or offset from one another in any other way in relation to the welding direction. It is also irrelevant whether a pulse welding process is used to carry out joint welding or weld cladding, or some other welding process. These statements naturally also apply in an analogous manner to a multiple pulse welding process having more than two pulse welding processes.

The well-known pulse welding process will be explained with reference to FIG. 2 based on the course of the welding current $I_S$ over time t. During the pulse welding, a base current $I_{SG}$ and a higher pulse current $I_{SI}$ alternate periodically at a predetermined pulse frequency $f_D$. The pulse frequency $f_D$ naturally results as the reciprocal of the period $t_D$ of a welding cycle SZ consisting of a base current phase having the base current $I_{SG}$ and a pulse current phase having the pulse current $I_{SI}$. During the pulse current phase, a weld droplet is to be released into the relevant weld pool 11. The pulse frequency $f_D$ and/or the value of the base current $I_{SG}$ to or of the pulse current $I_{SI}$ can also change during a welding process.

Figure 2:
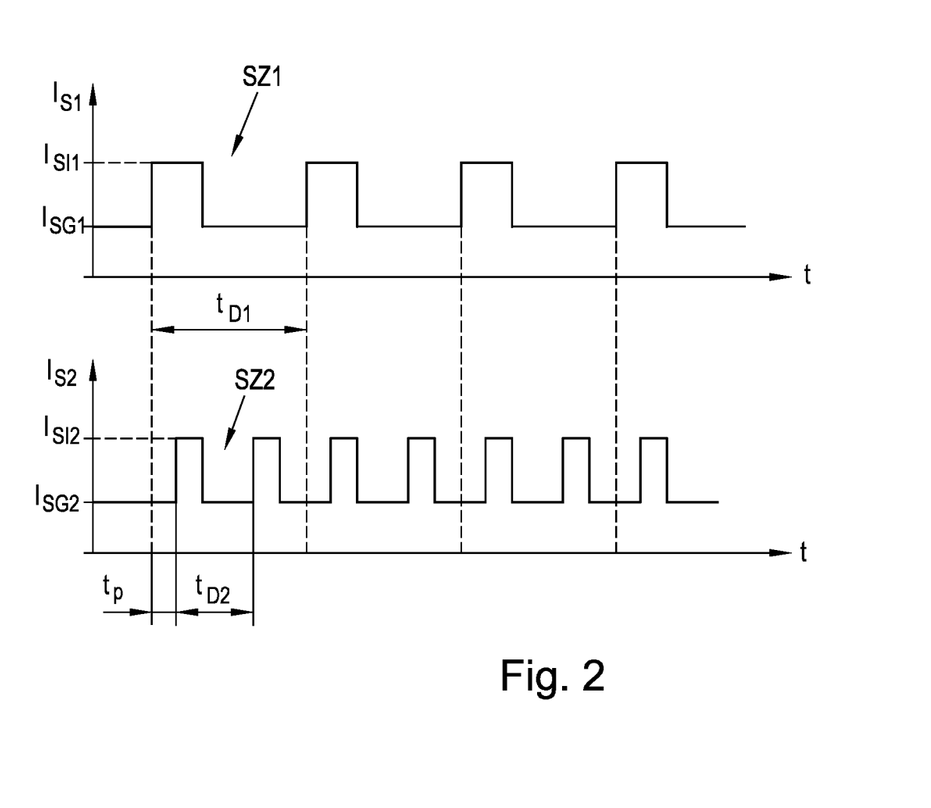
FIG. 2 shows the welding cycles in a multiple pulse welding process.

The courses of the welding currents $I_{S1}$, $I_{S2}$ over time are of course idealized and shown in a simplified manner in FIG. 2. In real life, of course, there will be certain current ramps on the flanks. It is often also provided for the welding current $I_S$ to drop in steps or with a different current curve during the transition from the pulse current $I_{SI}$ to the base current $I_{SG}$ in order to facilitate detachment of the droplet. Short intermediate current pulses are often also provided in the base current phase in order to increase the process stability, as will be described in more detail below. However, this does not change the period $t_D$ of a welding cycle SZ and the resulting pulse frequency $f_D$.

In a tandem pulse welding process according to the invention, the two pulse welding processes are synchronized with one another, in that the pulse frequencies $f_{D1}=1/t_{D1}$, $f_{D2}=1/t_{D2}$ of the two pulse welding processes are in a specific predetermined relationship with one another and the resulting welding cycles SZ1, SZ2 have a specific predetermined phase relationship with one another. Preferably, one pulse frequency is an integral multiple of the other pulse frequency. Of course, this also generally applies in an analogous manner to a multiple pulse welding process in which the individual pulse welding processes are synchronized with one another. In the example in FIG. 2, the pulse frequency $f_{D2}$, for example of the trailing pulse welding process, is twice as high as the pulse frequency $f_{D1}$, for example of the leading pulse welding process, but this can also be the other way round. In addition, the welding current curve having the higher pulse frequency $f_{D2}$ may be shifted in time by a phase shift $t_P$ relative to the welding current curve having the lower pulse frequency $f_{D1}$, i.e. the pulses having the pulse current $I_{SI}$ begin with a time offset. The phase shift may of course also be specified as a phase angle based on the pulse frequency $f_{D1}$ of the leading pulse welding process.

Usually, the leading pulse welding process will have the higher pulse frequency $f_{D1}$ and the trailing pulse welding process will have the lower or the same pulse frequency $f_{D2}$.

In the case of a multiple pulse welding process, there is a leading pulse welding process and a plurality of trailing pulse welding processes, the leading pulse welding process in this case also preferably having the highest pulse frequency and the trailing pulse welding processes having lower or equal pulse frequencies. The pulse frequencies of the trailing pulse welding processes do not necessarily have to be the same.

In order to carry out the above-described tandem pulse welding process, the relevant pulse frequency $f_{D1}$, $f_{D2}$ and any phase shift $t_P$ must be known in the two welding devices 1a, 1b, or more specifically in the control units 7a, 7b. The courses of the welding currents $I_{S1}$, $I_{S2}$ over time must therefore be synchronized with one another. In order to accomplish this, the two welding devices 1a, 1b must be synchronized with one another.

Figure 3:
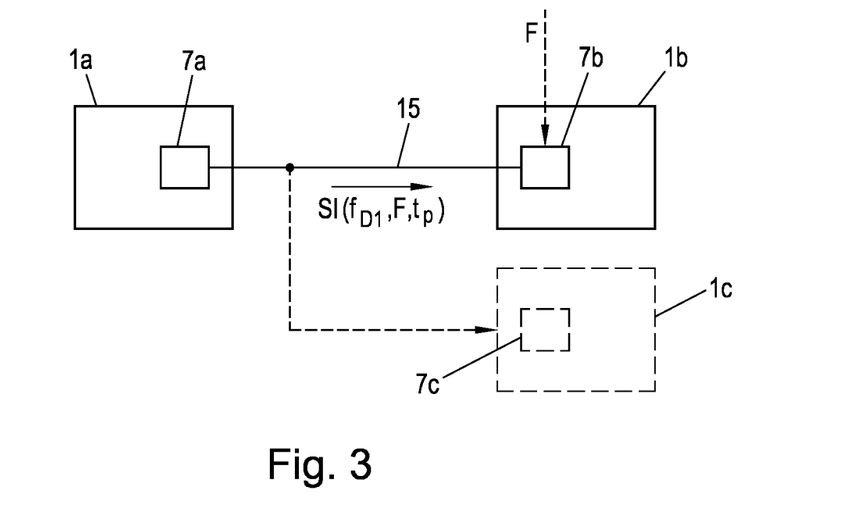
FIG. 3 shows the synchronization of the pulse welding processes by means of a communication link between the welding devices involved.

For this purpose, the welding devices 1a, 1b, 1c of the multiple pulse welding process, usually the control units 7a, 7b, 7c of the welding devices 1a, 1b, 1c, are connected to one another via a communication link 15, which may be wired or wireless, as shown in FIG. 3. At the beginning of the multiple pulse welding process, a synchronization information SI is transmitted via the communication link 15 from one welding device 1a, preferably of the leading pulse welding process, to the other welding device 1b, 1c, preferably of the trailing pulse welding processes. This synchronization information SI is used in the receiving welding device 1b, 1c in order to adapt, in particular to synchronize, the pulse welding process performed by means of this welding device 1b, 1c to the pulse welding process performed by means of the transmitting welding device 1a.

In the simplest case, the synchronization information SI is a single synchronization pulse SP which is sent by a transmitting welding device 1a via the communication link 15. The synchronization pulse SP is in a defined temporal relation to the welding cycle SZ1 in the transmitting welding device 1a. The synchronization pulse SP is preferably transmitted at the start of a welding cycle SZ1 (for example the start of a base current phase) at the pulse frequency $f_{D1}$ in the transmitting welding device 1a. The synchronization pulse SP may also be sent with a specific stored or set phase shift $t_P$ thereto. In order to achieve a more precise synchronization, known delay times, for example of the transmission, of a reaction time of the receiving welding device 1b, 1c, etc., can also be taken into account in the phase shift $t_P$.

The synchronization pulse SP may be transmitted as a current or voltage pulse on a wired communication link 15 between the two welding devices 1a, 1b. However, it is also possible to implement the communication link 15 as a data bus on which bus messages are sent. In this case, the synchronization pulse SP can be sent as a bus message, which can be done by means of wires (cable, optical fiber, etc.) or wirelessly (WiFi, Bluetooth, etc.). In the receiving welding device 1b, 1c, the welding current curve $I_S$ is synchronized based on the received synchronization pulse SP, for example in that a welding cycle SZ2 is started in the receiving welding device 1b at the pulse frequency $f_{D2}$ (for example with the base current phase) when the synchronization pulse is received. The respective pulse frequency $f_{D1}$, $f_{D2}$ may be stored or set in the welding devices 1a, 1b, 1c.

A phase shift $t_P$ may also be stored or set in a welding device 1b, usually the trailing welding device. The welding cycle SZ2 can thus also be started in the receiving welding device 1b by a phase shift $t_P$ after the synchronization pulse SP has been received.

Other required welding parameters, such as the welding currents $I_{SI1}$, $I_{SG1}$, $I_{SI2}$, $I_{SG2}$, the pulse current durations, base current durations, etc., are of course also stored or set in the welding devices 1a, 1b, 1c, such that the welding devices 1a, 1b, 1c are able to perform the pulse welding processes.

As such, it is irrelevant for the invention which welding device 1a, 1b is the transmitting device, i.e. leading in the synchronization, and which is the receiving device, i.e. trailing in the synchronization. This may, for example, be stored or set in the welding devices 1a, 1b, 1c involved in the multiple pulse welding process. This setting can of course also change, even during welding.

This setting can be made by the welder, for example via the respective input/output unit 8a, 8b.

However, a master control unit, for example a robot control or process control, which is connected to the welding devices 1a, 1b, 1c and which specifies this setting may also be provided. For this purpose, the welding devices 1a, 1b, 1c and the master control unit can be connected to one another in parallel or in series via a data bus in order to be able to make this setting. If the communication link 15 is designed as a data bus, then this data bus can also be used for this setting.

It is also conceivable for the setting for who leads in the synchronization to be stored in the welding device 1a, 1b, 1c depending on a welding parameter, for example the pulse frequency $f_D$ or the welding wire feed speed $v_D$. For this purpose, for example, it could be provided that the welding device 1a, 1b, 1c that carries out the pulse welding process at the highest pulse frequency $f_D$ is always the transmitting welding device and the others are the receiving ones.

In an enhanced embodiment, additional information may be transmitted via the communication link 15.

For example, the welding device 1a transmitting the synchronization information SI may also transmit its own pulse frequency $f_{D1}$ or the pulse frequency $f_{D2}$ to be set by the receiving welding device 1b as synchronization information SI, for example in its own or the same bus message. If its own pulse frequency $f_{D1}$ is transmitted, then a frequency divider F can be stored or set in the receiving welding device 1b (as indicated in FIG. 3). By means of the frequency divider F, the pulse frequency $f_{D2}$ can then be easily determined from the received pulse frequency $f_{D1}$ as $f_{D2}=f_{D1}/F$. To this end, it is of course advantageous if the two pulse frequencies $f_{D1}$, $f_{D2}$ are in an integer ratio (e.g. ½, ⅓, ¼) to one another, the frequency divider F thus being an integer. This also makes it possible to change the pulse frequencies $f_{D1}$, $f_{D2}$ during the multiple pulse welding process. For this purpose, it is sufficient, for example, for the leading welding device 1a to transmit a new pulse frequency $f_{D1}$ to the trailing welding device 1b, which then uses the frequency divider F to determine and set the pulse frequency $f_{D2}$ once again. The pulse frequency $f_{D2}$ of the receiving welding device 1b thus follows the pulse frequency $f_{D1}$ of the transmitting welding device 1a. In the other case, the receiving welding device 1b directly receives the pulse frequency $f_{D2}$ to be set from the transmitting welding device 1a, such that no settings whatsoever are required on the receiving welding device 1b in this regard. In both cases, the handling of the multiple pulse welding process is made easier for the welder.

In principle, the same procedure can also be used for the desired phase shift $t_D$. The phase shift $t_D$, which may also be zero, can be stored or set in a welding device 1a, 1b, or can be transmitted by a welding device 1a as synchronization information SI to the other welding device 1b, for example in a separate bus message or in a common bus message with other synchronization information SI.

The phase shift $t_D$ may also be set variably on a welding device 1a, 1b, for example as a time or also as a percentage. The phase shift $t_D$ may preferably be set variably between 0-100% in individual percentage steps, for example in 1% steps. For example, 25% corresponds to a phase shift of 90° and 50% corresponds to a phase shift of 180°. The phase shift $t_D$ may be set by the welder, or specified by a master control unit, for example again via a data bus as described above.

It would also be conceivable for the desired phase shift $t_D$ to be synchronized via the point in time at which the synchronization information SI is sent. The transmitting welding device 1a may, for example, transmit the synchronization information SI to the receiving welding device 1b with the phase shift $t_D$ after the start of the pulse current phase. In this case, the desired phase shift $t_D$ would be stored in the transmitting welding device 1a or set there. The receiving welding device 1b then begins its own pulse current phase or base current phase (depending on the synchronization) upon receipt of the synchronization information SI, as a result of which the desired phase shift $t_D$ is automatically set. It is thus possible to change/adapt the phase shift $t_D$ during the welding process.

Figure 4:
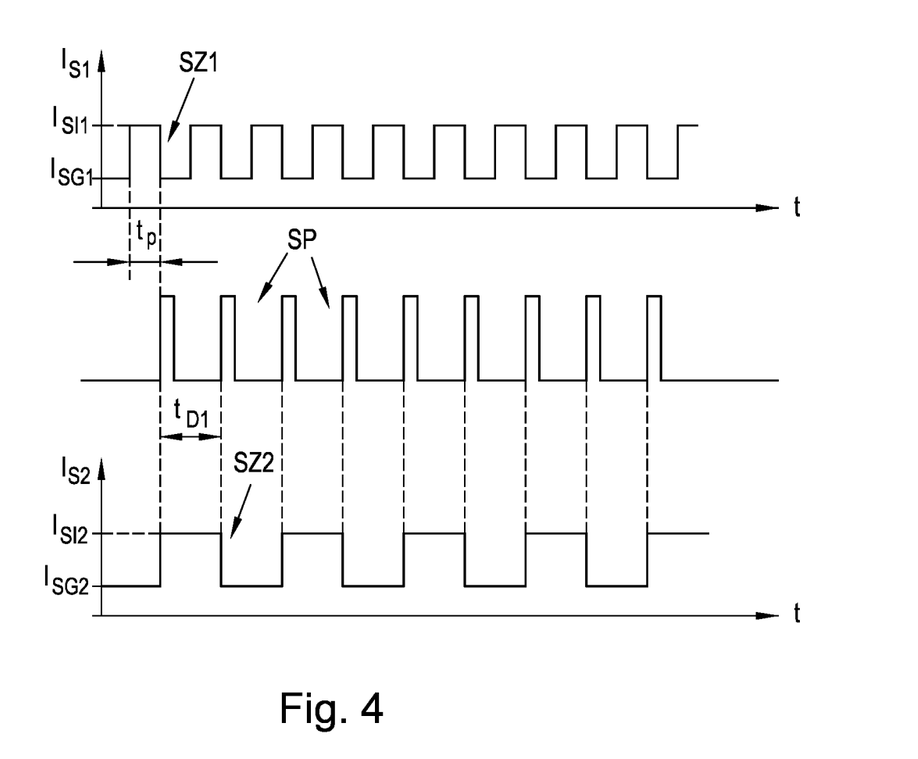
FIG. 4 shows the synchronization by means of synchronization pulses.

In another possible embodiment, the transmitting welding device 1a, for example the welding device leading in the tandem pulse welding process, continuously transmits synchronization pulses SP as synchronization information SI at its own pulse frequency $f_{D1}$, i.e. with a time period $t_{D1}$, as shown in FIG. 4. The synchronization pulses SP are in turn in a defined temporal relation to the welding cycle SZ1 in the transmitting welding device. For example, a synchronization pulse SP is transmitted at each start of a welding cycle SZ1, in this case at the start of the pulse current phase, taking into account a phase shift $t_P$. These synchronization pulses SP can in turn be transmitted as electrical current or voltage pulses on an electrical line as the communication link 15 or as bus messages on a wired or wireless data bus as the communication link 15. The receiving welding device 1b, for example the welding device that trails in the tandem pulse welding process, can simply determine the pulse frequency $f_{D1}$ of the transmitting welding device 1a from the period $t_{D1}$ of the received to synchronization pulses in an evaluation unit (hardware and/or software), for example in the control unit 7b, for example in a comparator circuit with a counter or from a time stamp of the received bus messages.

The welding cycle SZ2 in the receiving welding device 1b is again synchronized in time based on the synchronization pulses SP, for example in that the start of a welding cycle SZ2 in the receiving welding device 1b is synchronized upon receipt of a synchronization pulse SP.

A frequency divider F may in turn be stored in the receiving welding device 1b, from which frequency divider the pulse frequency $f_{D2}$ in the receiving welding device 1b can then be determined from $f_{D2}=f_{D1}/F$. For this purpose, it is of course advantageous if the two pulse frequencies $f_{D1}$, $f_{D2}$ are in an integer ratio to one another. As the synchronization pulses SP, are continuously transmitted, at least during the synchronization, the pulse frequency $f_{D2}$ of the receiving welding device 1b automatically follows the pulse frequency $f_{D1}$ of the transmitting welding device 1a.

In addition to the synchronization pulses SP, the transmitting welding device 1a may also transmit the value to be set for the pulse frequency $f_{D2}$ to the receiving welding device 1b, for example again in a separate bus message or in the same bus message. In this case, the synchronization pulses SP can be used to ensure and check the synchronization of the two welding devices 1a, 1b.

A phase shift $t_P$ of the two current profiles in the two welding devices $1a$, $1b$ can of course be set again by way of a time shift of the synchronization pulses SP in relation to the welding cycle SZ1 in the transmitting welding device $1a$. The receiving welding device $1b$ synchronizes the course of the welding current $I_{S2}$ over time with the received synchronization pulses SP, as shown in FIG. 4. Alternatively, a desired phase shift $t_P$ can be stored or set as a welding parameter in the receiving welding device $1b$. In this case, the receiving welding device $1b$ would relate the welding cycle SZ2 to the receipt of the synchronization pulse SP in a manner shifted in time by the phase shift $t_D$. In principle, however, both are also possible at the same time.

Figure 5:
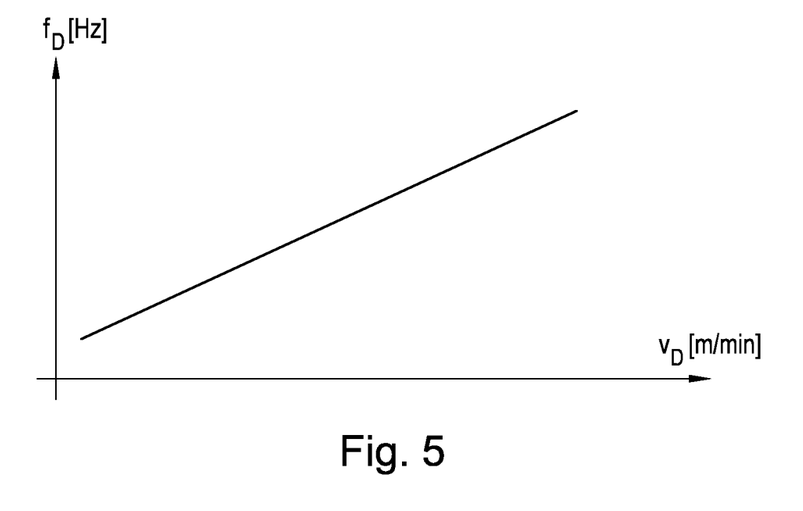
FIG. 5 shows a possible welding characteristic curve of a pulse welding process.

The pulse frequency $f_{D1}$, $f_{D2}$ required for the pulse welding process, or a frequency divider F, can be set by the welder on the welding devices $1a$, $1b$. However, this requires in-depth process knowledge on the part of the welder, which cannot be assumed. It can therefore be provided for a pulse frequency $f_{D1}$, $f_{D2}$ to be derived from other set welding parameters, in particular from a welding wire feed speed $v_D$ (which in turn is usually dependent on the welding current) or a welding current $I_S$. A welding characteristic curve for different welding wires, as shown in FIG. 5 using the example of the welding wire feed speed $v_D$, may be to stored in the welding device $1a$, $1b$, for example in the control unit $7a$, $7b$ or a memory unit. The required pulse frequency $f_D$ can be taken from this characteristic depending on the set welding wire feed speed $v_D$. For synchronization, it is advantageous if a pulse frequency $f_D$ determined in this way is set to the nearest integer ratio to the other pulse frequency $f_D$. A required frequency divider F, which is preferably set to the nearest whole number, can then also be derived from this. It follows from this that, instead of the pulse frequency $f_{D1}$, the welding wire feed speed $v_{D1}$ could also be sent to the receiving welding device $1b$ in an equivalent manner if the welding characteristic curve is stored in both welding devices $1a$, $1b$.

Figure 6:
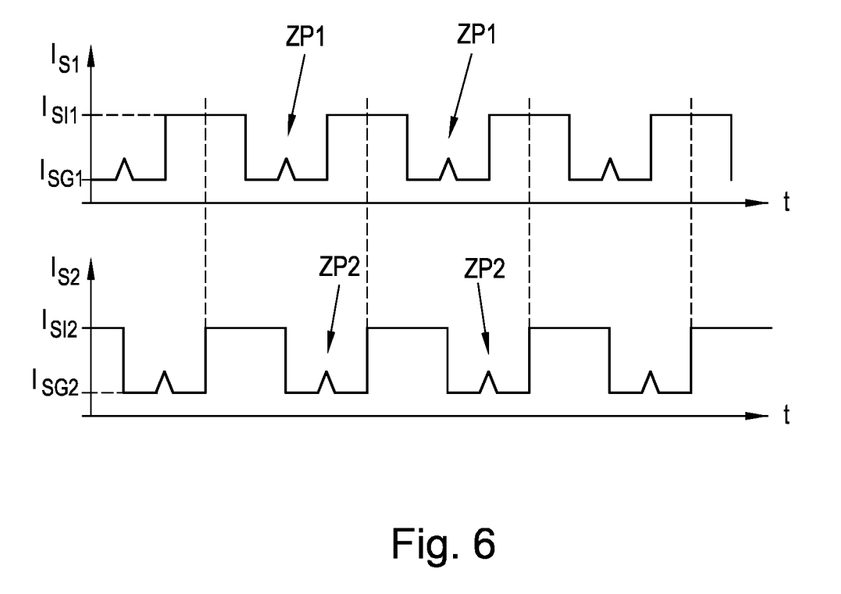
FIG. 6 shows pulse welding processes with intermediate pulses.

FIG. 6 shows a tandem pulse welding process with $f_{D1}=f_{D2}$ (i.e. frequency divider F=1) and with a phase shift $t_P$ of 90°. In addition, short intermediate pulses ZP1, ZP2 are provided in both pulse welding processes in the base current phases, i.e. brief increases in the welding current $I_{S1}$, $I_{S2}$. The duration and the increase in the intermediate pulses ZP1, ZP2 can of course be stored or configured in the welding devices $1a$, $1b$. It is, however, of course possible for intermediate pulses ZP1, ZP2 to not be provided in all pulse welding processes of the multiple pulse welding process. It is also conceivable for such intermediate pulses ZP1, ZP2 to not be provided in every welding cycle SZ1, SZ2, but only in every nth welding cycle, which can also be stored or configured. The intermediate pulses ZP1, ZP2 are preferably set in a pulse welding process in such a way that they are within the pulse current phase of the other pulse welding process. This can be achieved very easily, for example, with a phase shift of 180°, in which a base current phase and a pulse current phase overlap in the two pulse welding processes.

The synchronization according to the invention of the pulse welding processes of a multiple pulse welding process can be started and stopped as required during welding. When welding starts, the synchronization is preferably only started after the arcs of the individual pulse welding processes burn in a stable manner, i.e. after the arcs have been ignited or when the set welding wire feed speed $v_D$ has been reached. The synchronization is also preferably ended in the end phase of the multiple pulse welding process, for example when the welding wire feed speed $v_D$ has started to be reduced. This can be done automatically by the welding devices $1a$, $1b$, or manually by the welder.

It is also possible for the synchronization of the pulse welding processes to change during welding. For example, a different frequency divider F may be set or result during welding. However, the welding wire feed speed of the trailing pulse welding process can also be changed, which can also bring about a different pulse frequency $f_{D2}$ or frequency divider F. A different phase shift $t_P$ between pulse welding processes may also be required or set. Such changes can, for example, be brought about by the multiple pulse welding process (e.g. an automated welding program) and/or by the welder.

For example, the deviation between a pulse frequency $f_{D1}$, which is required by the leading pulse welding process and with which the trailing pulse welding process is synchronized, and a pulse frequency $f_{D2}$, which would result from the stored welding characteristic curve (e.g. as in FIG. 5) due to the set welding parameters, may exceed a limit value configured or stored in welding device $1a$, $1b$. In this case, the control unit $7a$, $7b$ of the welding device $1a$, $1b$ may, for example, switch to the next frequency divider F, for example from F=1 to F=2 or in the other direction, i.e. from F=2 to F=1. If necessary, a phase shift $t_P$ can also be adapted in this course.

Figure 7:
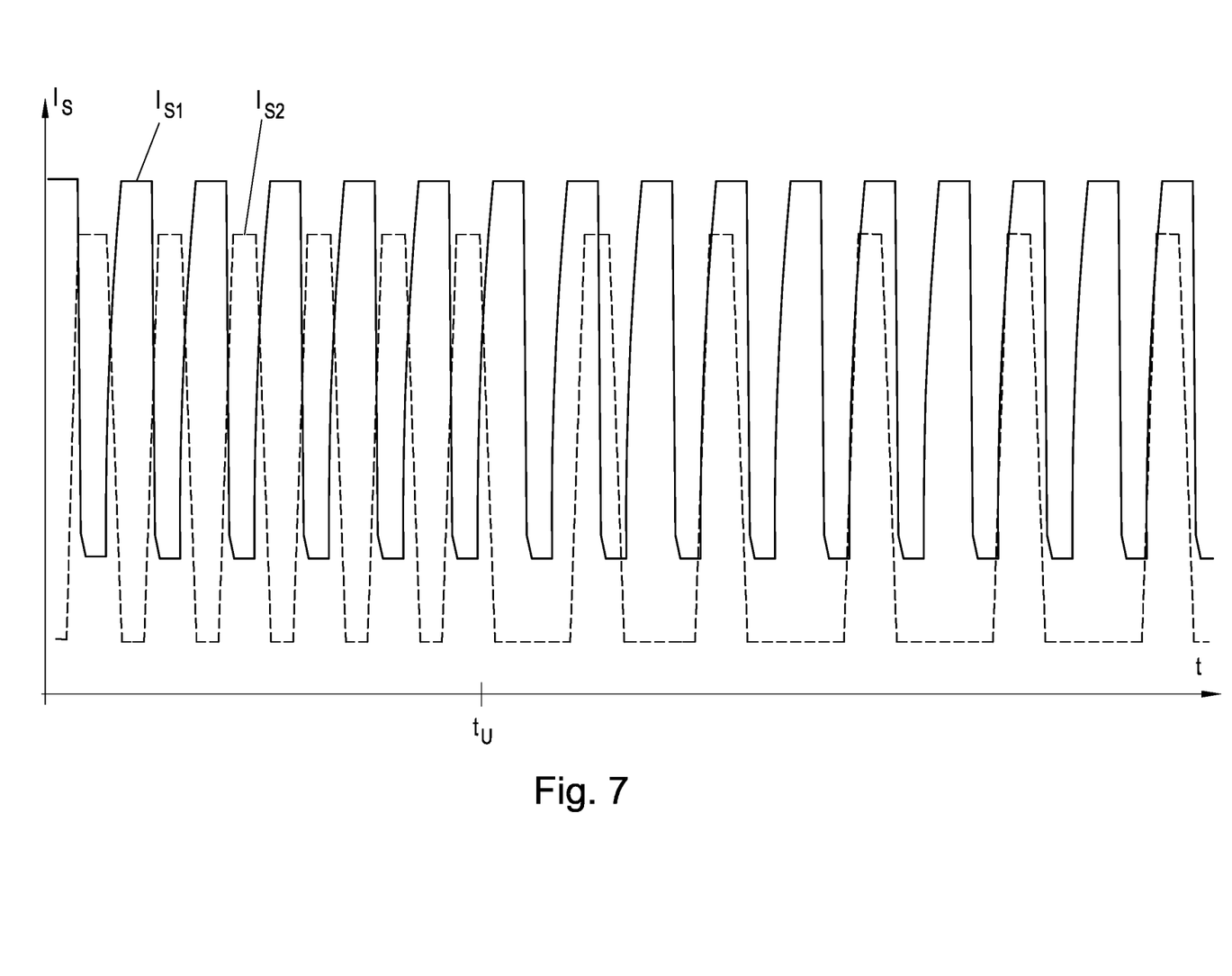
FIG. 7 shows a switchover of the synchronization during welding.

FIG. 7 shows, by way of example, the switchover between synchronization with the same pulse frequencies $f_{D1}$, $f_{D2}$ in a tandem pulse welding process, i.e. $f_{D1}=f_{D2}$, and a phase shift $t_P$ of 180° to a halved pulse frequency $f_{D2}$ of the trailing pulse welding process, i.e. $f_{D2}=f_{D1}/2$ or frequency divider F=2, and a phase shift $t_P$ of 0°. The welding current $I_{S1}$ of the leading pulse welding process and the welding current $I_{S2}$ of the trailing pulse welding process (dashed lines) are shown over time t. The switchover takes place at time $t_U$. With the switchover, the new pulse frequency $f_{D2}$ is used. The new phase position is possibly set within a few welding cycles SZ1, SZ2, depending on the implementation of the control. In the example according to FIG. 7, the new phase position is set within four welding cycles SZ1 of the leading pulse welding process.

The invention claimed is:

1. A method for synchronizing at least two pulse welding processes for carrying out a multiple pulse welding process, a pulse welding process comprises periodically, at a pulse frequency, repeating welding cycles having a pulse current phase and a base current phase, said method comprising:

performing each pulse welding process by a welding device, the welding devices being connected to one another by a communication link and synchronization information being transmitted via the communication link from a transmitting welding device to at least one receiving welding device;

using the synchronization information in the at least one receiving welding device to synchronize the pulse welding process performed by the at least one receiving welding device with the pulse welding process performed by the transmitting welding device;

transmitting, using the transmitting welding device, at least one synchronization pulse as synchronization information to the at least one receiving welding device, the at least one synchronization pulse being in a defined temporal relation to the welding cycle of the pulse welding process of the transmitting welding device, and the welding cycle of the pulse welding process of the at least one receiving welding device being synchronized based on the received synchronization pulse;

wherein
either the pulse frequency of the transmitting welding device is transmitted to the at least one receiving welding device as synchronization information; and the pulse frequency to be set by the at least one receiving welding device is determined in the at least one receiving welding device from the received pulse frequency of the transmitting welding device by a known frequency divider;

or the transmitting welding device continuously transmits synchronization pulses together with the pulse frequency of the transmitting welding device to the at least one receiving welding device as synchronization information; and the at least one receiving welding device determines the pulse frequency of the transmitting welding device from the period of the received synchronization pulses and determines the pulse frequency to be set in the at least one receiving welding device from the determined pulse frequency of the transmitting welding device by a known frequency divider.

2. The method according to claim 1, wherein:
the frequency divider is determined in the at least one receiving welding device from a known welding characteristic curve of at least one welding parameter; and
the pulse frequency to be set by the at least one receiving welding device is determined from the pulse frequency of the transmitting welding device, or associated welding wire feed speeds, and from the frequency divider.

3. The method according to claim 2, wherein:
a pulse frequency required for the pulse welding process is determined from the welding characteristic curve of the pulse welding process of the at least one receiving welding device; and
the frequency divider is determined from the required pulse frequency and the received pulse frequency of the transmitting welding device, or the associated welding wire feed speeds.

4. The method according to claim 3, wherein:
a ratio between the received pulse frequency of the transmitting welding device and the required pulse frequency, that is set to the nearest smaller or larger integer, is used as the frequency divider.

5. The method according to claim 1, wherein:
the synchronization pulse is transmitted with a predetermined phase shift at a start of the welding cycle in the transmitting welding device and/or the welding cycle is started in the at least one receiving welding device with a predetermined phase shift after the synchronization pulse is received.

6. The method according to claim 5, wherein:
the phase shift to be set by the at least one receiving welding device is transmitted as additional synchronization information from the transmitting welding device to the at least one receiving welding device.

7. The method according to claim 1, wherein:
the synchronization is started or stopped during the multiple pulse welding process.

8. The method according to claim 1, wherein:
the pulse frequency of the pulse welding process of the transmitting welding device or the pulse frequency of the pulse welding process of a trailing pulse welding process and/or a phase shift is changed during the multiple pulse welding process.

9. An arrangement for carrying out a multiple pulse welding process, said arrangement comprising:
at least two welding devices configured to carry out at least two pulse welding processes, each of the pulse welding processes comprising periodically, at a pulse frequency, repeating welding cycles having a pulse current phase and a base current phase;
the welding devices being connected to one another by a communication link;
a transmitting welding device being configured to transmit synchronization information via the communication link to at least one receiving welding device, the at least one receiving welding device being configured to use the synchronization information to synchronize the pulse welding process performed by the at least one receiving welding device with the pulse welding process performed by the transmitting welding device;
the transmitting welding device being configured to transmit at least one synchronization pulse, which is in a defined temporal relation to the welding cycle of the pulse welding process of the transmitting welding device, as synchronization information to the at least one receiving welding device, and the at least one receiving welding device being configured to synchronize a respective welding cycle of the pulse welding process based on the received synchronization pulse;
the transmitting welding device being configured either to transmit the pulse frequency of the transmitting welding device to the at least one receiving welding device as synchronization information and the receiving welding device being configured to determine a pulse frequency, to be set by the at least one receiving welding device, from the received pulse frequency of the transmitting welding device by a known frequency divider, or the transmitting welding device being configured to transmit synchronization pulses continuously with the pulse frequency of the transmitting welding device to the at least one receiving welding device as synchronization information, and the at least one receiving welding device being configured to determine the pulse frequency of the transmitting welding device from the period of the received synchronization pulses and to determine the pulse frequency to be set in the at least one receiving welding device from the determined pulse frequency of the transmitting welding device by a known frequency divider.

10. The arrangement according to claim 9, wherein:
the at least one receiving welding device is configured to determine the frequency divider from a known welding characteristic curve of at least one welding parameter, and to determine a pulse frequency to be set by the at least one receiving welding device from the pulse frequency of the transmitting welding device, or associated welding wire feed speeds, and from the frequency divider.

11. The arrangement according to claim 10, wherein:
the at least one receiving welding device is configured to determine a pulse frequency required for the pulse welding process from the welding characteristic curve of the pulse welding process of the at least one receiving welding device and to determine the frequency divider from the required pulse frequency and the received pulse frequency of the transmitting welding device, or the associated welding wire feed speeds.

12. The arrangement according to claim 11, wherein:
the at least one receiving welding device is configured to use a ratio between the received pulse frequency of the transmitting welding device and the required pulse frequency, which ratio is set to the nearest smaller or larger integer, as the frequency divider.

* * * * *